United States Patent [19]
Rosaen

[11] 4,434,670
[45] Mar. 6, 1984

[54] FLUID FLOW METER

[76] Inventor: Borje O. Rosaen, 4031 Thornoaks Dr., Ann Arbor, Mich. 48104

[21] Appl. No.: 299,394

[22] Filed: Sep. 4, 1981

[51] Int. Cl.³ .............................................. G01F 1/22
[52] U.S. Cl. .................................................. 73/861.54
[58] Field of Search ............... 73/215, 861.53, 861.54, 73/861.56

[56] References Cited

U.S. PATENT DOCUMENTS

| | | | |
|---|---|---|---|
| 522,995 | 7/1894 | Maxim | 73/861.54 |
| 1,238,498 | 8/1917 | Dawley | 73/861.54 |
| 2,003,474 | 6/1935 | Schweitzer | 73/861.54 |
| 3,224,270 | 12/1965 | Karol et al. | 73/861.56 |
| 3,693,441 | 9/1972 | Obstfelder | 73/861.54 |
| 3,859,854 | 1/1975 | Dye et al. | 73/215 |

*Primary Examiner*—Herbert Goldstein
*Attorney, Agent, or Firm*—Gifford, Van Ophem, Sheridan & Sprinkle

[57] ABSTRACT

A fluid flow meter is provided for indicating the fluid flow rate in two or more predetermined flow ranges. The flow meter comprises a housing having an inlet open to a cylindrical inlet chamber and an outlet open to a cylindrical outlet chamber. At least two cross passages in the housing interconnect the inlet and outlet chambers at axially spaced positions. A piston is slidably mounted within the inlet chamber and sequentially opens the cross passages to the inlet chamber in dependence upon the fluid flow rate into the housing inlet. The position of the piston is visible exteriorly of the housing and its position within the inlet chamber provides a visual signal of the fluid flow rate through the flow meter. The piston can be spherical, cylindrical, etc. in shape.

14 Claims, 9 Drawing Figures

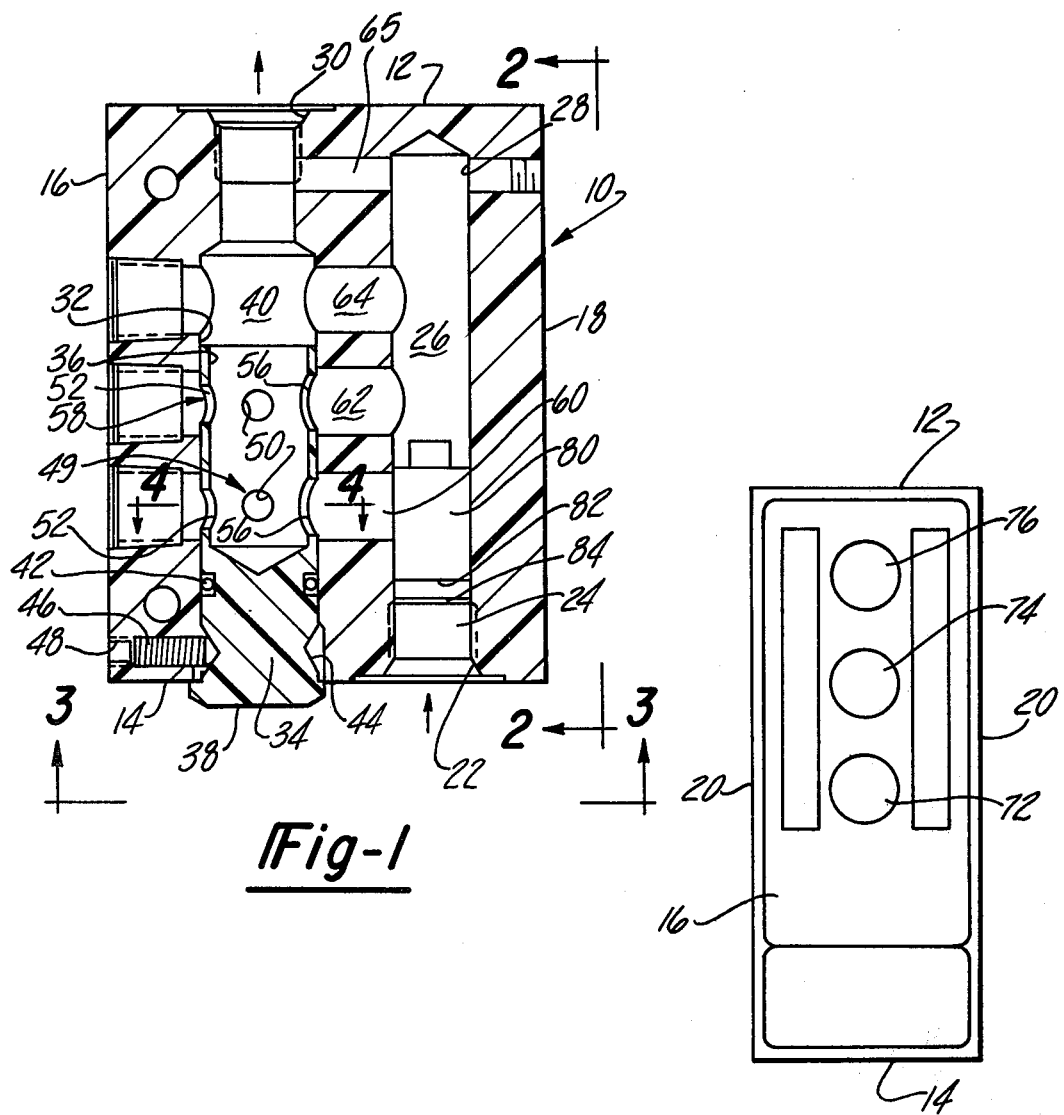
Fig-1
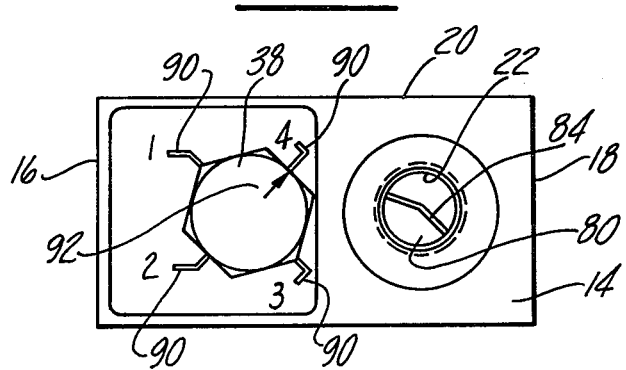
Fig-3
Fig-2

FLUID FLOW METER

BACKGROUND OF THE INVENTION

I. Field of the Invention

The present invention relates to fluid flow meters.

II. Description of the Prior Art

There are a number of previously known fluid flow meters for measuring and indicating the flow rate of a fluid. For example, in one type of previously known flow meter, a semicircular vane cooperates with a hemispherical wall so that a variable size opening is formed between the vane and the wall depending upon the rotational position of the vane. The fluid flows from an inlet, through the variable size opening and out through the flow meter outlet. The rotational position of the vane, and thus the flow rate through the flow meter, is displayed on a scale which is visible exteriorly of the flow meter. There are also many other types of fluid flow meters.

These previously known fluid flow meters, while accurate and satisfactory in operation, are relatively expensive in construction. Furthermore, for many flow meter applications it is necessary only to determine whether the flow rate to the flow meter is within a predetermined flow range. Consequently, the high accuracy obtained by these previously known flow meters is not required for such applications.

SUMMARY OF THE INVENTION

The present invention provides an inexpensive fluid flow meter for indicating the fluid flow rate in two or more predetermined flow ranges.

In brief, the flow meter according to the present invention comprises a housing having a fluid inlet open to an elongated cylindrical fluid inlet chamber. Similarly, the housing includes an outlet which is open to an elongated and generally cylindrical outlet chamber. At least two cross passageways are formed in the housing between the inlet and outlet chambers and these cross passageways are axially spaced from each other.

A piston is axially slidably mounted within the inlet chamber and at least a portion of the plunger has a cross sectional shape substantially the same as the cross sectional shape of the inlet chamber. The piston is urged, preferably by its own weight, toward the inlet end of the inlet chamber.

In operation, influent through the housing inlet will force the piston upwardly in the inlet chamber until at least a portion of the cross passageway closest to the inlet end of the inlet chamber is uncovered. The fluid then flows through the cross passage, to the outlet chamber and out through the housing outlet. A further increase in the fluid flow rate into the inlet chamber up to a predetermined maximum gradually forces the piston upwardly in the inlet chamber until the entire first cross passageway is uncovered by the piston. A fluid flow rate from zero and up to this predetermined maximum forms the first flow range for the flow meter.

A further flow rate increase of influent into the inlet chamber forces the piston to slide axially upwardly in the inlet chamber and partially uncover the second cross passageway in addition to the now fully uncovered first cross passageway. A still further increase of the influent flow rate up to a second predetermined maximum forces the piston upwardly in the inlet chamber to gradually uncover the second cross passageway until the second cross passageway is completely opened by the piston. The fluid flow rate between the first and second predetermined maximum flow rates comprises the second flow range for the flow meter and so on for any further cross passageways between the inlet and outlet chamber.

The position of the piston within the inlet chamber is visible exteriorly of the housing and provides an indication of the range of the fluid flow rate through the flow meter. Preferably, the housing is constructed of a translucent or transparent material so that the piston is visible directly through the housing.

In the preferred embodiment of the invention, a variable orifice is positioned within the outlet chamber and is operable to vary the flow ranges of the flow meter. In addition, if desired, a proximity switch responsive to the position of the piston can be attached to the housing for activating an alarm when the fluid flow rate through the flow meter exceeds a predetermined amount.

BRIEF DESCRIPTION OF THE DRAWING

A better understanding of the present invention will be had upon reference to the following detailed description when read in conjunction with the accompanying drawing, wherein like reference characters refer to like parts throughout the several views, and in which:

FIG. 1 is a cross sectional view illustrating a preferred embodiment of the flow meter according to the present invention;

FIG. 2 is a side view taken substantially along line 2—2 in FIG. 1;

FIG. 3 is a bottom view taken substantially along line 3—3 in FIG. 1;

DETAILED DESCRIPTION OF THE PREFERRED EMBODIMENTS OF THE PRESENT INVENTION

Figure 4:
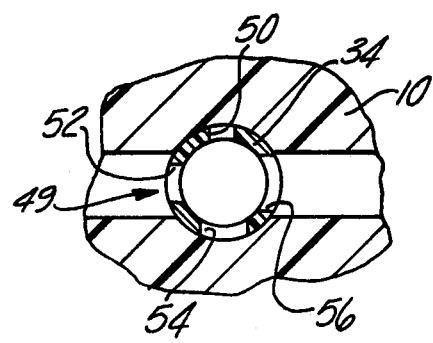
FIG. 4 is a fragmentary sectional view taken substantially along line 4—4 in FIG. 1.

With reference first to FIGS. 1-3, a first preferred embodiment of the flow meter according to the present invention is thereshown and comprises a generally rectilinear housing 10. The housing 10 includes a top wall 12, bottom wall 14, back wall 16, front wall 18 and side walls 20. The entire housing 10 is preferably constructed of a transparent or translucent material, such as plastic, for a reason to be subsequently described.

With reference now to FIGS. 1 and 3, the housing 10 includes a fluid inlet 22 formed on its bottom 14 which is open to the lower end 24 of an elongated cylindrical inlet chamber 26. The other or upper end 28 of the inlet chamber 26 terminates short of the housing top wall 12.

Similarly, a fluid outlet 30 is formed on the housing top wall 12 and is open to an elongated cylindrical throughbore 32 extending between the housing top wall 21 and bottom wall 14. Both the inlet 22 and outlet 30 are internally threaded for connection with conventional fluid fittings.

A cylindrical orifice member 34 has an axially extending recess 36 formed in one end and an enlarged hex bolt head 38 formed at its other end. The orifice member 34 is positioned within the housing throughbore 32 so that the bolt head 38 abuts against the bottom 14 of the housing 10. The outside diameter of the orifice member 34 is substantially the same as the diameter of the housing throughbore 32 so that the recess 36 together with the throughbore 32 forms an outlet chamber 40 which is open to the housing outlet 30.

Referring now particularly to FIG. 1, the orifice member 34 carries an annular seal member 42 which sealingly engages the housing 10 adjacent the bolt head 38. An annular V-shaped groove 44 is formed on the orifice member immediately adjacent the bolt head 38 while a set screw 46 threadably engages a threaded bore 48 in the housing 10 and intersects this groove 44. Consequently, the set screw 46 prevents axially movement of the orifice member 34 while still enabling rotation of the orifice member 34. Upon tightening, however, the set screw 46 locks the orifice member 34 against rotation.

With reference now particularly to FIG. 1 and 4, a first set 49 of four circumferentially spaced but axially aligned ports 50, 52, 54 and 56 extend radially through the orifice member 34 and intersect the recess 36. The ports 50–56 are preferably equidistantly circumferentially spaced from each other and increase in size from the port 50 and to the port 56. A second set 58 of ports 50–56 are also formed through the orifice member 34 at a position axially spaced from the first set 49 of ports. This second set 58 also comprises four ports 50–56 circumferentially spaced from each other and increasing in size from the ports 50 and to the port 56.

Figure 5:
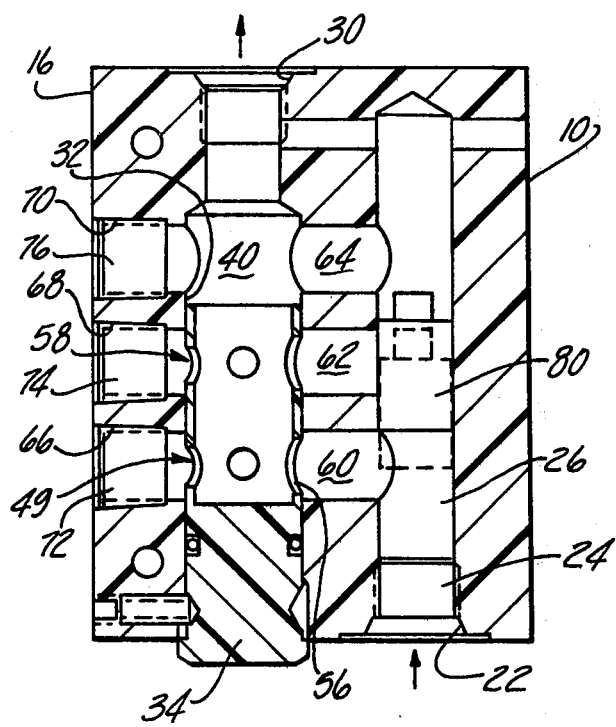
FIG. 5 is a cross sectional view similar to FIG. 1 but showing the flow meter with the fluid flow rate in a first predetermined flow range.

With reference now particularly to FIGS. 2 and 5, a first cross passageway 60 is formed in the housing 10 and fluidly connects the inlet chamber 26 to the outlet chamber 40 via one of the ports in the first set 49. Similarly, a second cross passage 62 in the housing 10 connects the inlet chamber 26 with the outlet chamber 40 via one of the ports in the second set 58 and this second cross passageway intersects the inlet chamber 26 at a position spaced upwardly from the first cross passageway 60. A third cross passageway 64 in the housing 10 extends directly between the inlet chamber 26 at a position spaced upwardly from the second passageway 62 and the outlet chamber 40. A fourth cross passageway 65 is formed between the upper end of the inlet chamber 26 and the outlet chamber 40.

Although the cross passageways 60, 62 and 64 can be formed in any conventional fashion, in the preferred embodiment of the invention, these passageways 60 and 64 are formed by drilling from the housing back wall 16, through the housing throughbore 32 and to the inlet chamber 26. In doing so, three access holes 66, 68 and 70 are formed between the back wall 16 and the housing throughbore 32. These access holes 66–70 are closed by plugs 72, 74 and 76, respectively, and are secured to the housing 10 in any conventional fashion.

With reference again to FIGS. 1 and 3, a cylindrical piston 80 is axially slidably mounted within the housing inlet chamber 26. The lower end 82 of the piston 80 is substantially the same shape and size as the cross sectional area of the inlet chamber 26 so that fluid flow along the sides of the piston 80 is negligible. A retainer 84 is attached to the housing 10 at the inlet end 24 of the inlet chamber 26 and retains the piston 80 within the chamber 26.

With reference now to FIG. 5, in operation fluid flow through the inlet 22 and into the lower end 24 of the inlet chamber 26 causes the piston 80 to rise to the position shown in phantom line thus opening a portion of the cross passageway 60. The influent then flows through the cross passageway 60, through the orifice 56, and out through the outlet 30 via the outlet chamber 40. At this time, the position of the piston 80 can be viewed through the transparent housing 10.

A further increase of the fluid flow rate into the inlet 22 up to a first predetermined maximum flow rate causes the piston 80 to move to the position shown in solid line in FIG. 5. At this time, the entire cross passage 60 is uncovered by the piston 80 so that the piston 80 does not restrict the fluid flow into the cross passage 60.

Figure 6:
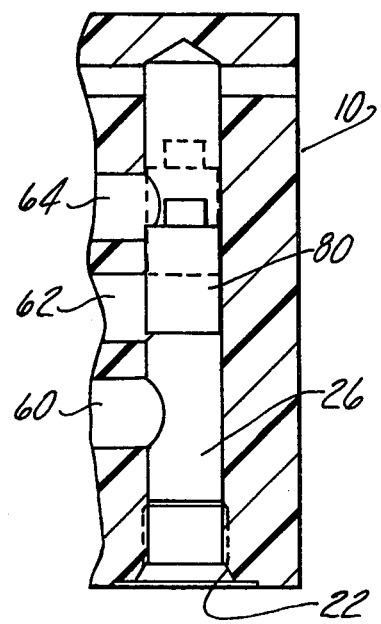
FIG. 6 is a fragmentary sectional view similar to FIG. 5 but illustrating the flow meter in a second predetermined flow range.

With reference now to FIG. 6, an increase of the fluid flow rate into the housing inlet 22 greater than the first predetermined flow rate causes the piston 80 to immediately shift upwardly in the inlet chamber 26 to the position shown in solid line in FIG. 6. In doing so, the piston 80 uncovers the lower portion of the second cross passage 62 thus enabling the influent to flow from the inlet chamber 26 and into the outlet chamber 40 through the first two cross passageways 60 and 62. At this time, the piston 80 restricts the fluid flow through the second cross passageway 62. In addition, the position of the piston 80 continue to be viewed directly through the housing 10.

A further increase of the flow rate into the housing inlet 22 from the first predetermined maximum flow rate and to a second predetermined maximum flow rate causes the piston to slide gradually axially upwardly in the inlet chamber 26 and to the position shown in phantom line in FIG. 6. At this time, both the first cross passageway 60 and the second cross passageway 62 are entirely uncovered by the piston 80 thus enabling direct and unrestricted fluid communication between the inlet chamber 26 and the cross passageways 60 and 62.

Figure 7:
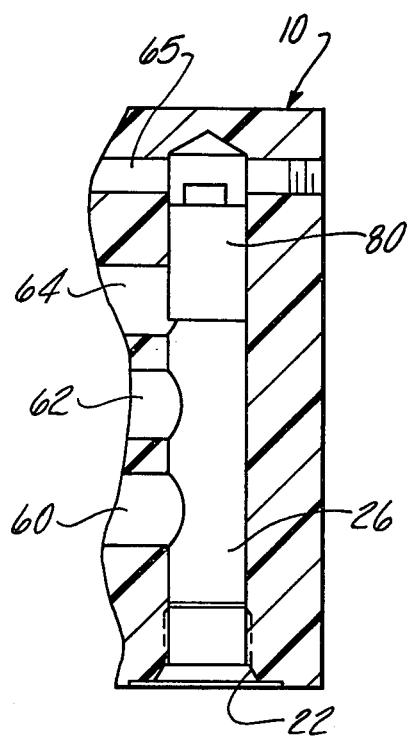
FIG. 7 is a fragmentary sectional view similar to FIG. 6 but showing the flow meter in a third predetermined flow range.

With reference now to FIG. 7, a further increase of the fluid flow rate into the housing inlet 22 above the second predetermined maximum flow rate will cause the piston 80 to axially shift upwardly in the inlet chamber 26 thus uncovering at least a portion of third cross passageway 64. The fourth cross passageway 65 relieves the fluid pressure in the inlet chamber 26 above the piston 80 and enables the piston 80 to reach the position shown in FIG. 7. The position of the piston remains visible directly through the housing 10 indicating that the fluid flow rate through the flow meter is in its third or maximum flow range.

From the foregoing, it can be seen that the present invention provides a simple flow meter for indicating when the fluid flow rate through the flow meter is in any of three mutually exclusive flow ranges. In the first flow range, i.e., from zero flow up to the first predetermined maximum flow rate, the piston 80 partially or wholly uncovers the first cross passageway 60. In the second flow range, i.e., a flow rate between the first predetermined maximum flow rate and the second predetermined maximum flow rate, the piston 80 partially or wholly uncovers the second cross passageway 62. At flow rates exceeding the second predetermined maximum flow rate, the third cross passageway 64 is either partially or wholly uncovered by the piston 80. It will be understood, of course, that the flow meter of the present invention can be used to indicate four or even more flow ranges by simply increasing the number of cross passageways extending between the inlet chamber 26 and outlet chamber 40.

In the preferred form of the invention, the inlet chamber 26 is substantially vertically aligned and the inlet 22 is open to the lower end 24 of the chamber 26. By this construction, the weight of the piston 80 urges the piston 80 toward the inlet end 24 of the chamber 26. Other means, however, can be alternatively used to urge the piston 80 towards the inlet end 24 of the inlet chamber 26. For example, a spring or other resilient means can be disposed within the inlet chamber 26 between its upper end 28 and the piston 80 to perform this function in which case it is unnecessary that the inlet chamber 26 by vertically oriented.

With reference now to FIGS. 1 and 3, the entire fluid flow through the lower two cross passageways 60 and 62 must also flow through one of the ports in the orifice member 34. Since the ports 50-56 in each set 49 and 58 vary in size, the restriction of, and thus the maximum flow rate through, the cross passageways 60 and 62 can be varied by rotation of the orifice member 44 to bring a different size port into registration with the cross passageways 60 and 62. The rotation of the orifice member 34 can be easily accomplished by using a wrench on the bolt head 38, and appropriate marks 90 (FIG. 3) on the bottom 14 of the housing 10 are used in conjunction with a pointer 92 on the bolt head 38 to indicate which ports are aligned with the cross passageways 60 and 62. The variable restriction of the cross passageways 60 and 62 by the orifice member 34 enables the flow meter 10 to measure and indicate different flow ranges. For example, when the relatively small ports are aligned with the cross passageways 60 and 62, the flow meter of the present invention is used to measure and differentiate between relatively small flow rates. Conversely, when the larger ports are aligned with the cross passageways 60 and 62, the flow meter measures and differentiates between relatively larger flow rates.

Figure 8:
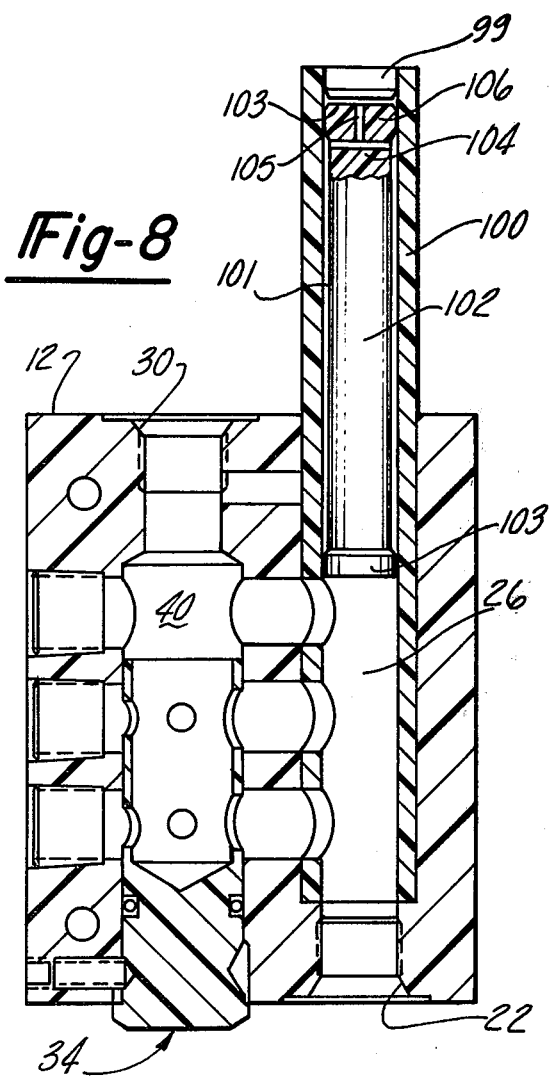
FIG. 8 is a cross sectional view illustrating a second preferred embodiment of the flow meter of the present invention.

With reference to FIG. 8, a modification of the present invention is thereshown in which a transparent tube 100 closed by a plug 99 at its upper end extends coaxially outwardly from the inlet chamber 26 and upwardly from the housing top wall 12. In addition, in the modification shown in FIG. 8, an elongated piston 102 replaces the piston 80 so that a portion of the piston 102 is visible through the tube 100 at all flow ranges of the flow meter. Thus, the flow range of the fluid flow through the flow meter can be read directly through the transparent tube 100 and, if desired, an indicator mark 104 is provided on the piston 102 to enhance visibility of the piston. In this embodiment of the flow meter it is unnecessary for the flow meter housing 12 to be constructed of a transparent material since the position of piston 102 is seen through the transparent tube 100. In addition, the piston 102 has a reduced diameter central portion 101, and ends 103 which are substantially the same diameter as the inner bore of the tube 100. An axial groove 105 in the upper piston and 103 relieves the pressure from fluid which otherwise would be trapped in the tube 100.

Figure 9:
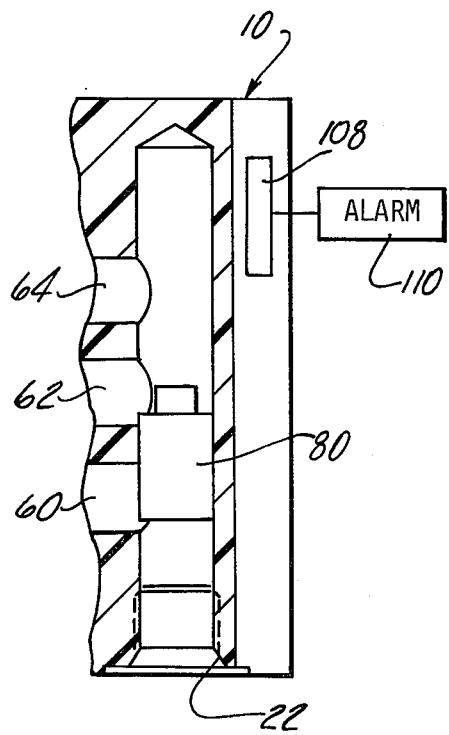
FIG. 9 is a fragmentary side view illustrating a modification of the invention.

Referring now to FIG. 9, a further modification is thereshown in which a proximity switch 100 is attached to the side of the housing, and upon activation, activates an alarm 110. This proximity switch 108 is responsive to the position of the piston 80 so that when the piston 80 nears its uppermost position, the switch 108 is actuated. In a preferred form of the invention, the proximity switch 108 is a magnetically activated switch and activated by a magnet carried at the top of the piston 80 or, alternatively, the piston 80 is a magnet.

From the foregoing, it can be seen that the flow meter according to the present invention provides a simple and inexpensive flow meter for indicating the flow rate through the flow meter is predetermined flow ranges. Furthermore, these flow ranges can be varied by rotation of the orifice member 34.

The fluid flow meter of the present invention can be used in a plurality of different applications. In particular, the flow meter of the present invention is particularly advantageous for measuring the leakage flow from the drain poirt of a piston pump. A relatively low flow rate from the drain port is indicative that the piston pump is in good operating condition. Conversely, a high flow rate from the piston pump drain port is indicative that repair of the pump is required. Alternatively, on systems such as lubrication supply systems, relatively low flow rates can be seen to be alarming.

Having described my invention, however, many modifications therto will become apparent to those skilled in the art to which it pertains without deviation from the spirit of the invention as defined by the scope of the appended claims.

I claim:

1. A fluid flow meter comprising:
   a housing having a fluid inlet and a fluid outlet,
   an elongated inlet chamber formed in said housing, said inlet chamber open at one end to said fluid inlet,
   an outlet chamber formed in said housing, said outlet chamber open to said fluid outlet,
   at least two cross passageways formed in said housing for fluidly connecting said inlet chamber to said outlet chamber, said cross passageways intersecting said inlet chamber at longitudinally spaced positions,
   means contained within the inlet chamber for establishing direct fluid communication between only one cross passageways and said inlet chamber when the fluid flow rate into said housing inlet is within a first flow rate range and for establishing direct fluid communication between both of said cross passageways and said inlet chamber when the fluid flow rate into said housing inlet is within a second flow rate range,
   means for indicating the flow rate range exteriorly of said housing,
   means for varying said flow rate ranges, and
   wherein said varying means comprises means for variably restricting said cross passageways.

2. The invention as defined in claim 1 wherein said restricting means comprises a tubular orifice member rotatably mounted in the outlet chamber so that the outer periphery of said orifice member extends across one end of said cross passageways and so that the interior of said orifice member is open to the outlet chamber, said sleeve having at least two circumferentially spaced ports which selectively register with said ends of said cross passageways in dependence upon the rotational position of said sleeve.

3. The invention as defined in claim 2 and including means accessible exteriorly of said housing for rotating said sleeve and means for locking said sleeve at a selected rotational position.

4. The invention as defined in claim 2 wherein two axially spaced sets of four axially aligned and circumferentially spaced ports are formed through said orifice member, the ports in each set selectively registering with one of said cross passageways in dependence upon the rotational position of the orifice member.

5. The invention as defined in claim 1 wherein said establishing means comprises a piston slidably mounted in said inlet chamber, said piston having a cross sectional shape at one end substantially the same as the cross sectional shape of said inlet chamber and means for urging said plunger towards the inlet end of said inlet chamber.

6. The invention as defined in claim 5 wherein said inlet chamber extends substantially vertically, said inlet end of said inlet chamber being at the lower end of said inlet chamber, and said piston being weighted.

7. The invention as defined in claim 5 and comprising a switch means secured to said housing and means carried by or integral with said piston for actuating said switch means when said piston is in a predetermined position in said inlet chamber.

8. The invention as defined in claim 5 and comprising a transparent tube secured to and extending outwardly from said housing, said tube being coaxial with said inlet chamber and said piston being slidably received in said tube.

9. The invention as defined in claim 8 wherein said piston is dimensioned so that a portion of said piston is visible through said tube at all flow ranges for the flow meter.

10. The invention as defined in claim 5 wherein said housing includes an access hole aligned with each cross passageway and extending between said outlet chamber and one side of said housing and a transparent or translucent plug for closing each access hole, wherein said piston is visible through one of said plugs in each of said flow ranges.

11. A fluid flow meter comprising:
a housing having a fluid inlet and a fluid outlet,
an elongated inlet chamber formed in said housing, said inlet chamber open at one end to said fluid inlet,
an outlet chamber formed in said housing, said outlet chamber open to said fluid outlet, said inlet and outlet chambers being spaced apart and generally parallel to each other,
at least two cross passageways formed in said housing for fluidly connecting said inlet chamber to said outlet chamber, said cross passageways intersecting the inlet chamber at longitudinally spaced positions,
means contained within the inlet chamber for establishing direct fluid communication between only one cross passageway and said inlet chamber when the fluid flow rate into said housing inlet is within a first flow rate range and for establishing direct fluid communication between both of said cross passageways and said inlet chamber when the fluid flow rate into said housing inlet is within a second flow rate range, and
means for indicating the flow rate range exteriorly of said housing,
said housing including an access hole aligned with each cross passageway and extending between said outlet chamber and one side of said housing,
at least two transparent or translucent plugs, one plug closing each access hole, and
wherein said means contained within said inlet chamber is visible through one of said plugs and one of said cross passageways when the fluid flow rate is in said first range and wherein said means contained within said inlet chamber is visible through the other plug and the other passageway when the fluid flow rate is in said second range.

12. The invention as defined in claim 11 wherein said establishing means comprises a piston slidably mounted in said inlet chamber, said piston having a cross sectional shape at one end substantially the same as the cross sectional shape of said inlet chamber and means for urging said piston towards the inlet end of said inlet chamber.

13. The invention as defined in claim 12 wherein said inlet chamber extends substantially vertically, said inlet end of said inlet chamber being at the lower end of said inlet chamber, and said piston being weighted.

14. The invention as defined in claim 12 and comprising a switch means secured to said housing and means carried by or integral with said piston for actuating said switch means when said piston is in a predetermined position in said inlet chamber.

* * * * *

UNITED STATES PATENT AND TRADEMARK OFFICE
CERTIFICATE OF CORRECTION

PATENT NO. : 4,434,670
DATED : March 6, 1984
INVENTOR(S) : Borje O. Rosaen

It is certified that error appears in the above—identified patent and that said Letters Patent is hereby corrected as shown below:

Column 3, line 2 delete "21" insert --12--.

Column 6, line 16 delete "poirt" insert --port--.

Signed and Sealed this

Eighteenth Day of September 1984

[SEAL]

Attest:

GERALD J. MOSSINGHOFF

Attesting Officer

Commissioner of Patents and Trademarks

UNITED STATES PATENT AND TRADEMARK OFFICE
CERTIFICATE OF CORRECTION

PATENT NO. : 4,434,670
DATED : March 6, 1984
INVENTOR(S) : Borje O. Rosaen

It is certified that error appears in the above—identified patent and that said Letters Patent is hereby corrected as shown below:

Column 7, line 12, Claim 5, delete "plunger" and insert --piston--.

Signed and Sealed this

Eleventh Day of December 1984

[SEAL]

Attest:

GERALD J. MOSSINGHOFF

Attesting Officer     Commissioner of Patents and Trademarks